Patented Aug. 10, 1954

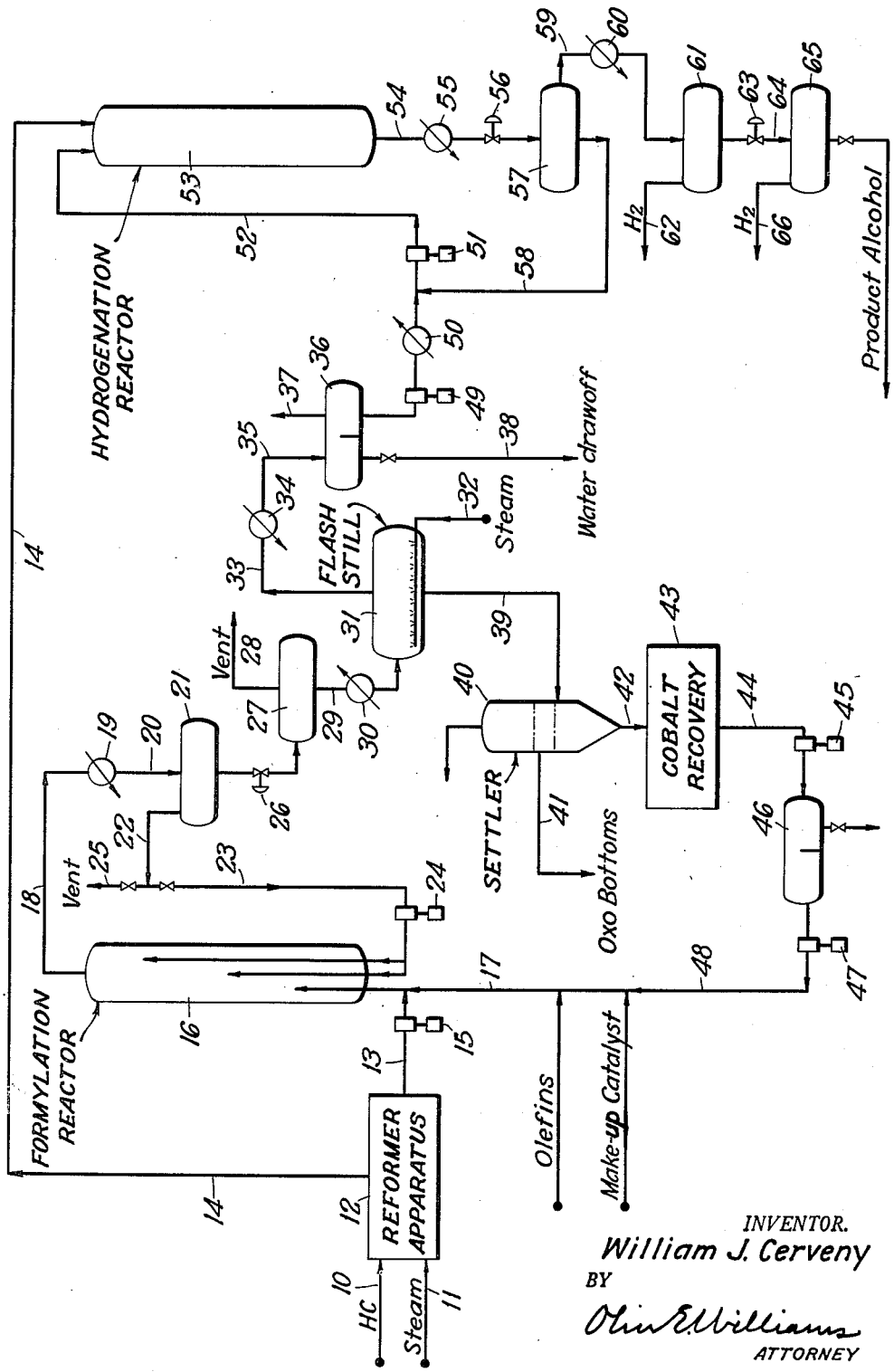

2,686,206

UNITED STATES PATENT OFFICE 2,686,206

OXO PROCESS

William J. Cerveny, Lansing, Ill., assignor to Standard Oil Company, Chicago, Ill., a corporation of Indiana Application February 28, 1950, Serial No. 146,752

5 Claims. (Cl. 260—604)

This invention relates to the synthesis of oxygenated hydrocarbons by the catalyzed reaction of olefinic hydrocarbons, carbon monoxide and hydrogen. The invention has particular reference to improvements in that synthesis reaction which is well known as the Oxo process and wherein aldehydes are prepared by reaction between the aforesaid reactants in the presence of a formylation catalyst and are subsequently hydrogenated in the presence of a hydrogenation catalyst to produce alcohols having one more carbon atom per molecule than the employed olefin.

The Oxo reaction is customarily catalyzed by a cobalt catalyst. Cobalt compounds supplied to the initial formylation reaction are apparently converted under reaction conditions to cobalt carbonyl compounds that are believed to constitute the active formylation catalyst. Certain of these carbonyl compounds are oil soluble and readily volatile; they consequently tend to be lost in the product and to condense in and obstruct other equipment employed in the process.

The hydrogenation catalyst of the second step of the Oxo process is usually a finely divided metallic nickel or cobalt but other well known hydrogenation catalysts can also be employed. The hydrogenation catalyst can readily be poisoned, and it is especially sensitive to carbon monoxide and sulfur. It is, consequently, necessary to substantially eliminate cobalt carbonyl from the formylation product because carbon monoxide will otherwise be liberated from the said carbonyl in the product under hydrogenation conditions.

A primary object of the present invention is the provision of improvements in the Oxo process for synthesis of oxygenated hydrocarbons, particularly alcohols, from olefinic hydrocarbons, carbon monoxide and hydrogen. Another object of the invention is the provision of improvements in the process whereby the proportion of oxygenated compound converted to alcohols in the hydrogenation step is increased. A further object of the invention is the provision of improvements in the Oxo process whereby the hydrogenation catalyst employed therein will have an extended active life. Yet another object is the provision of improvements in the Oxo process whereby catalyst loss is greatly reduced. The invention has for other objects such additional advantages or results as will be found in the specification or the claims hereinafter made.

Briefly stated, the present invention comprises the catalytic formylation of olefinic hydrocarbons having from about three to twelve carbon atoms per molecule, and the distillation in the presence of saturated steam and water of the formylation product providing separation of aldehydes and simultaneous phase migration or transfer of cobalt catalyst into solution in the water, the said distillation being effected substantially without loss in ultimate alcohol yield. The invention also comprises hydrogenation of the steam distilled formylation product to form alcohols having one more carbon atom per molecule than the employed olefin, and the recycling of recovered catalytic cobalt, transferred from solution in the formylation product into aqueous solution by and during said steam distillation, to the formylation step.

In carrying out the process of invention, carbon monoxide and hydrogen in a mol ratio of from 2:1 to ½:1 is reacted with at least a mol equivalent of an olefinic hydrocarbon having from about three to twelve carbon atoms per molecule, at a temperature between about 100° C. and 250° C. and at pressures ranging from about 50 to about 300 atmospheres. Reaction is carried out in the presence of an oil soluble or water soluble cobalt catalyst compound that is present in adequate amount to yield the necessary catalyst. The introduced cobalt catalyst compounds in the formylation step convert from non-volatile cobalt compounds, that are termed potential catalysts, into volatile cobalt carbonyl compounds that appear to be the actual catalysts of the reaction. This catalyst, being volatile, flows from the formylation zone with the product and being at least in part oil soluble dissolves in and contaminates the product. Examples of potential cobalt catalysts are cobalt oxide, cobalt acetate, cobalt naphthenate, cobalt carbonate, cobalt hydroxide, cobalt oxolate, cobalt phosphate and cobalt chloride. Water or steam can be beneficially introduced into the formylation reactor and when water soluble potential catalyst is employed, it can be introduced in solution in the water.

The formylation product contains largely aldehydes and also some alcohol. A certain amount of high molecular weight substances will also be found in the formylation product, especially when a mixed olefinic stock has been employed as feed reactant for the formylation step. Even, however, when a selected olefinic hydrocarbon of a single molecular weight or a narrow range of molecular weight is employed aldol condensation and like polymerization reactions will result in a small quantity of "Oxo bottoms" product. Even if the production of a substantially pure aldehyde were the sole object sought, it would be necessary to separate the formylation product, but past investigators have been unsuccessful, for the reasons hereinafter noted, and have encountered high product losses.

The formylation product is highly susceptible to further aldol condensation and other dehydration reactions so that either atmospheric or vacuum distillation will result in considerable loss of aldehyde and alcohol product.

When, however, the formylation product is steam distilled in the presence of water, the aldehydes can be separated with substantially no loss of aldehydic product. Simultaneously with the aldehyde separation, cobalt carbonyl contained in the product will be decomposed and the cobalt will be transferred into aqueous solution. Preferably the steam distillation should be performed at a rate preventing the accumulation in the distillation zone of components of the product that are steam-distillable under the employed conditions.

The effect of the described saturated steam distillation is multiple and surprising. During the steam distillation cobalt catalyst that is dissolved as a cobalt carbonyl in the Oxo product will migrate therefrom and will form a solution in the hot aqueous phase. This result occurs even when the cobalt compound that is used as the potential catalyst in the formylation step does not have an acidic ion. For example, cobalt oxide when converted to the carbonyl cannot contribute an acidic ion to the formylation product as cobalt acetate does, but nevertheless cobalt carbonyl derived from cobalt oxide migrates to the hot aqueous phase during steam distillation. It appears that sufficient acids are formed during the formylation reaction or the steam distillation to dissolve that cobalt which is made available by the decomposition of the cobalt carbonyl. Whatever the phenomenon, over 90% of the cobalt carried over as cobalt carbonyl is recoverable by the aforesaid distillation step. Sulfur compounds which may be present in the formylation product appear to be high boiling or nonvolatile and are concentrated in the bottoms during steam distillation.

Formylation product which has been steam distilled is then directed to the hydrogenation step wherein the predominantly aldehydic product is hydrogenated to product alcohols. The hydrogenation catalyst can be any well known hydrogenation catalyst but is preferably finely divided metallic cobalt. As aforementioned, this catalyst can readily be poisoned, especially by the presence of carbon monoxide in the inlet hydrogen or the formylation product. It has been found that the aforesaid flash steam distillation, either by clarifying the formylation product and removing contaminants therefrom or by more completely stripping cobalt carbonyl from the said product, will increase the active life of the hydrogenation catalyst by as much as nineteen to twenty times the active life period previously exhibited.

Hydrogenation of the steam distilled formylation product results in an alcohol product in which the percentage of remaining aldehydes is appreciably less than when the product is not steam distilled. Steam distillation of the formylation product also permits the effective use of a lower temperature of hydrogenation, 100° to 250° C. is preferred. The use of lower hydrogenation temperatures particularly prevents hydrogenation of oxygenated compounds to hydrocarbons. Formylation product often contains about 60% of unreacted olefins. When the product is steam distilled an olefin fraction can readily be separated by the distillation and be recycled to the formylation zone, thus greatly reducing the volume of the charge to the hydrogenation reaction and increasing its capacity.

In the accompanying drawing, which is supplied to illustrate a preferred embodiment of the improved Oxo process of invention, the single figure is a schematic flow diagram of a process for producing alcohols from olefinic hydrocarbons. Referring now to the drawing, with occasional reference also to an example of operation in which relative flow rates and operating conditions are given, light hydrocarbon gases or liquids and steam are delivered respectively through lines 10 and 11 into gas reforming means 12 of conventional design wherein there is produced a mixed gas containing hydrogen and carbon monoxide. Other methods of producing synthesis gas, such as the water gas process, can as well be employed. The mixed gas may be produced in a ratio of one mol of hydrogen to one mol of carbon monoxide or the ratio of gases can be varied between about one-half and three mols of hydrogen per mol of carbon monoxide. The mixed gases are delivered from the reformer apparatus 12 through a gas line 13. Hydrogen, for subsequent use in the process, is also produced in the aforesaid means 12 by known methods and flows therefrom through line 14.

Mixed gas containing hydrogen and carbon monoxide in a mol ratio of 1:1 is pumped through the line 13 by a pump 15 into a formylation reactor 16 at a rate of about 1,200,000 cubic feet per day. Liquid olefinic hydrocarbons are introduced into the reactor through line 17 at a rate of about 2000 gallons per hour. Potential cobalt catalyst is introduced into the reactor as a slurry in said liquid olefins. The reactor is maintained at a temperature of about 165° C. and under a pressure of about 3000 pounds per square inch gauge. The liquid hourly space velocity should be about one and a tower of approximately 3 feet in diameter and 4 feet high is of suitable capacity to convert the said 1,200,000 cubic feet of mixed gas per day and yet provide adequate volume of cooling recycle gases.

Vapors leaving the formylation reactor 16 flow through line 18. The said vapors contain unreacted olefins, aldehydes, alcohol and high boiling product. In addition, vaporized cobalt carbonyl compound escapes from the reactor 16 with the outlet vapors. The aforesaid vapors are passed through a cooler 19 whereby the said vapors can be reduced in temperature to about 38° C. A mixture of condensed liquids and vapor flows from the cooler 19 through line 20 into a separator 21 which operates under approximately reactor pressure. Gases separated in the separator 21 flow through line 22 and are pumped through line 23 by a pump 24 into the reactor 16 in the staggered manner indicated in the drawing, so that the cooled gases will have an optimum cooling effect on the reaction mixture. Any undesired excess of recycle gases can be bled off through vent line 25. By the preceding arrangement a volume of gases as high as 10 to 20 times the volume of inlet mixed gas can be recycled to the formylation reactor to provide turbulence and cooling capacity, especially where other cooling equipment is inadequate or not available.

Liquid formylation product from separator 21 is passed through a pressure reducing valve 26 to a low pressure separator 27 which may operate at about 40 pounds per square inch gauge and from which gases are discharged through a line 28. These gases may be vented particularly to prevent the build-up of methane in the system or they can be recycled to the feed-gas synthesis means. Liquid from the separator 27 flows through line 29 through a preheater 30 and into a flash still 31. Steam is introduced into the still 31 through a line 32 and a large volume of boiling water is maintained in the said still. Preheated liquid flowing into the still from the said line 29 and containing in solution therein cobalt carbonyl compounds flashes upon contact with the steam and boiling water in the still 31. Vapors from this flash distillation flow overhead through a line 33 into a cooler or condenser 34 and thence through a line 35 into a separator 36. Liberated gases are vented through line 37. These gases constitute almost entirely carbon monoxide which was either present in solution in the formylation product or more probably was present as a complex in a cobalt carbonyl compound; and they can be recycled, if desired, to the formylation reactor. Water separated in the separator 36 is withdrawn through line 38.

As previously pointed out, the aforesaid steam distillation effects the migration of catalyst into aqueous solution and this said migration occurs during distillation in the flash still 31. Still residue from the said flash still 31 is drained therefrom through a line 39 into a settling tank 40. The high boiling fraction of the formylation product which is known as "Oxo bottoms" is decanted through line 41. Aqueous catalyst solution is drained from the separator 40 through a line 42 into a cobalt recovery means 43.

The said cobalt recovery means 43 can include several known means for treating the aqueous solution of cobalt compound and recovering thereby potential cobalt catalyst in a preferred form for reuse in the formylation reactor. Such means, for example, as treatment with acids or caustic solution or causing a double decomposition reaction can be employed therein. Cobalt catalyst compound in suspension or solution is pumped through line 44 by a pump 45 into a separator 46 in which treating or converting reactants are separated therefrom. So-separated catalyst which may, for example, be slurried in a portion of the liquid olefinic hydrocarbon is pumped from the separator by a pump 47 through line 48 into line 17 and therefrom into the reactor 16. Thus, the recycle catalyst is introduced into the reactor in admixture with make-up catalyst and fresh olefinic hydrocarbons. Formylation product that is substantially completely catalyst free and from which the higher boiling bottoms product has been separated is pumped at a rate of 2200 gallons per hour from the separator 36 by a pump 49 through a preheater 50. The preheated formylation product is pumped by a pump 51 in admixture with recycled unreacted formylation product through a line 52 into a hydrogenation reactor 53. One or several hydrogenation reactors can be employed in series or in parallel to effect complete hydrogenation of the formylation product. However, the activity of the hydrogenation catalyst is maintained at such high level by the improved provisions of the present invention that a single hydrogenation reactor will provide a substantially aldehyde-free alcohol product, particularly if the product of the hydrogenation reactor is fractionated and the aldehyde fraction therefrom recycled. The hydrogenation reactor is operated under a pressure of about 800 pounds per square inch and at a temperature between about 100° and 250° C. The introduced liquid is allowed to travel down over the hydrogenation catalyst, for example, cobalt metal deposited on pumice, and to react with hydrogen introduced through the said line 14. A liquid hourly space velocity of about 0.1 to about 0.4 based on the volume of incoming liquid or about 0.2 to 1.2 volumes of liquid per hour per volume of catalyst space provides preferred yields. Liquid product and gases contained therein flow from the hydrogenation reactor through line 54 at a temperature of about 200° C. into a cooler 55 and through a pressure release valve 56. Liquid is flowed from the pressure release valve 56 into a recycle separator 57 which is maintained at about 335 pounds per square inch gauge. Approximately 5000 gallons per hour of liquid is separated in the recycle separator 57 and is flowed through line 58 into admixture with inlet formylation product in line 52. Hot liquid from the recycle separator 57 flows from the separator through a line 59 through a cooler 60 and into an initial pressure-reduction collector 61 that is maintained at a temperature of about 38° C. and a pressure of about 30–35 pounds per square inch gauge. Hydrogen is vented therefrom through vent line 62. As much as 600,000 cubic feet of hydrogen per day can be removed from the system at this point and utilized in other refinery units employing hydrogen. The product stream from separator 61 flows through a pressure-reducing valve 63 disposed in line 64 and flows into collector 65 that is maintained at a pressure of about 30 to 40 pounds per square inch gauge. Hydrogen is released from the liquid in collector 65 through a vent line 66. The described low temperature and low pressure gas separation effects substantially complete gasification and avoids loss of products with vented gas.

The hydrogenated product contained in the collector 65 can be fractionally distilled and an aldehyde fraction thereof be continuously recycled to the hydrogenation zone whereby a final product even lower in aldehyde content can be produced. Such fractional distillation besides separating out an aldehyde fraction will separate overhead the codimer gasoline product and provide a bottoms product containing the alcohol and a small amount of high boiling compounds. The alcohol can be separated from high boiling compounds contained therein by a second distillation and a second hydrogenation step can thereafter be performed upon the so-separated alcohols thereby removing substantially completely all aldehydic contaminants. As aforestated, however, the intermediate flash steam distillation step of invention maintains the hydrogenation catalyst in the said reactor 52 at such a high level of activity that the additional fractionating and hydrogenating equipment, briefly described above, will ordinarily be unnecessary.

The aliphatic alcohol produced as hereinabove described may have a refractive index $(n_D^{20})$ of 1.438 and a specific gravity (15.56/15.56) of about 0.843, an aldehyde content less than 0.5%, a neutralization number of about 0.02 milligram of KOH per gram, a color of about 20 Saybolt and a distillation range of about 193° to 196° C.

*Example I*

This example provides an illustration of steam distillation of formylation product to effect a migration of cobalt carbonyl catalyst from the said product into aqueous solution.

A mixture of octenes that was obtained by dimerization of olefins contained in a butane-butylene stream by means of a polymerization catalyst was formylated under the following conditions: The mixed octenes were preheated at about 166° C. and pumped under pressure of about 3000 pounds per square inch gauge into a formylation reactor. A solution of cobalt naphthenate was present in a relative quantity of about 0.11 weight per cent cobalt based on the olefin charged. Hydrogen and carbon monoxide in a ratio of approximately one mol of hydrogen per mol of carbon monoxide was introduced into the reactor under the said pressure of about 3000 pounds per square inch gauge. The product of the formylation step contained 28.1 volume per cent of nonyl aldehydes, 5.4% nonyl alcohols, 57.5% octenes, 10.6% bottoms product, 0.051 weight per cent of sulfur, and 0.35 milligrams of cobalt per cubic centimeter of product.

This mixed product was introduced slowly into a flash still containing a large volume of boiling water. Steam was introduced into the boiling water during the entire period of flash steam distillation in order to supply distillation steam and to help maintain the water level in the flash still. A distillate was continuously flashed from the surface of the boiling water and flowed from the flash still through a water jacketed condenser. The condensed distillate was collected in a separator. The collected fraction constituted 93 volume per cent of the charge and consisted of 27.3 volume per cent of nonyl aldehydes, 3.8% nonyl alcohols, 69.0% of octenes and 0.0005 weight per cent sulfur. Only a trace of sulfur and no trace of cobalt could be found in the distillate. A remaining 7 volume per cent of the charged formylation product was recovered as high boiling bottoms which contained 0.13 weight per cent of sulfur and approximately 0.8 weight per cent of the total dissolved cobalt charged to the flash still. The aqueous layer remaining in the still contained 93 weight per cent of the total cobalt charged to the still.

*Example II*

This example demonstrates the benefit of steam distillation of formylation product in reducing the aldehyde content of hydrogenation product and also points out the advantage of permitting hydrogenation at a lowered temperature so as to reduce hydrogenation of olefins or oxygenated compounds to form hydrocarbons.

Formylation of a mixture of octenes was performed at a temperature of about 150° C., a liquid hourly space velocity of 0.65, and a pressure of 3000 pounds per square inch gauge. Hydrogen and carbon monoxide were employed in a ratio, respectively, of 0.83:1. Potential catalyst in the relative amount of 0.11 weight per cent as cobalt based on the weight of olefins treated was used.

The formylation product consisted of 59.1 volume per cent of octenes, 30.6% nonyl aldehydes, 8.0% nonanols, 5% bottoms product and 0.7 milligram of cobalt per cubic centimeter of product. This material was slowly fed into a flash still containing boiling water and through which steam was continuously passed. The nonyl aldehydes and other low boiling compounds were separated from the bottoms product by the said flash distillation and carried along with excess steam to a water cooled condenser and were therein condensed. The condensate separated into a lighter oily layer and a heavier aqueous layer. The lighter layer consisted of 63.2% by volume of mixed octenes, 30.6% of nonyl aldehydes, and 4.0% of nonyl alcohols.

A portion of the separated distillate was then introduced into a hydrogenation reactor containing a cobalt catalyst consisting of 12.6% metallic cobalt on a 4 to 8 mesh pumice. The reactor was maintained at a temperature of 211° C. and product was passed therethrough at a liquid hourly space velocity of 0.85. Hydrogen at a pressure of 798 pounds per square inch gauge was passed through the reactor and flowed therefrom at a rate of 0.97 cubic foot per hour. The product contained 28.6% by volume of nonyl alcohols and only 0.3% of nonyl aldehydes.

Another portion of the separated distillate of the formylation product was hydrogenated at the considerably higher temperature of 260° C., at a liquid hourly space velocity of 0.83, at a pressure of 803 pounds per square inch gauge and in the presence of 0.98 cubic foot per hour of excess hydrogen. The product contained 20.4% by volume nonyl alcohols and 0.5% by volume nonyl aldehydes. The elevated hydrogenation temperature resulted in a loss of 9.7% by volume of the introduced oxygenated compounds, these having been hydrogenated to hydrocarbons.

Failure to steam distill the formylation product in experiments carried out as above described resulted in hydrogenation products containing in one instance 2% and in another 4% by volume of nonyl aldehydes, or approximately 10% to 20% respectively of the volume of the produced nonyl alcohols.

*Example III*

This example, in which the preferred flash steam distillation step is described in considerable detail, shows that substantially no polymerization or decomposition of formylation product occurs during steam distillation and further demonstrates the greatly increased hydrogenation catalyst life provided by the process of invention.

A formylation product prepared by substantially the same method as that described in Example I consisted of the following: 29.7% by weight nonyl aldehydes, 5.6% nonyl alcohols and 55.4% mixed octenes. The said formylation product was introduced at a rate of one-half gallon per hour into a 30 gallon stainless steel flash still which contained 15 gallons of boiling water. As water was taken overhead as steam in admixture with distilled formylation product, additional boiling water was introduced into the flash still. A total of 225.7 pounds of formylation product was introduced into the still. The mixed steam and distillate were condensed in a water cooled condenser and delivered into a separator. About 90% by weight of the material charged was recovered from the separator as a water-white oil containing 30.7% nonyl aldehydes, 4.8% nonyl alcohols, and 64.5% mixed octenes. An additional intermediate fraction constituting only 1.3% based on the material charged was somewhat straw colored and was recovered at the end of the distillation run. It constituted 54.3% nonyl aldheydes, 21.6% nonyl alcohols, and 24.1% higher boiling polymers.

The bottoms product which remained as a residue in the flash still along with the remaining water was flowed therefrom to a separator. The bottoms product constituted by weight 9.3% based on the material charged and consisted of 20.3% nonyl aldehydes, 12.7% nonyl alcohols and the remainder high boiling polymers. A relative weight ratio of water to oil in the distillate during the described flash distillation was approximately 1.3:1. The distillation was performed at a temperature of approximately 100° C. and at a rate of about 4 pounds of formylation product overhead per hour.

The steam distilled formylation product, prepared as above described, and also an acid washed but not steam distilled formylation product were hydrogenated at a temperature of 232° C. using a 100 cubic centimeter volume of 6% cobalt on pumice catalyst. The products were fed through the hydrogenation reactor at a feed rate of 83 cubic centimeters per hour. The steam distilled formylation product had an initial nonyl aldehydes content of 33.5% and the other formylation product an initial nonyl aldehydes content of 31.8%. During hydrogenation of the acid-washed feed the product thereof displayed an immediately increasing content of aldehydes, thus demonstrating that the hydrogenation catalyst immediately began to deteriorate. The product contained over 2% aldehydes even before fifteen pounds of this acid washed formylation product had been hydrogenated. After sixty pounds had been hydrogenated, approximately 10% of the product consisted of nonyl aldehydes. Hydrogenation of the steam distilled material on the other hand produced over sixty pounds of hydrogenation product having less than 1% aldehydes. The results indicated that the steam distillation increased the effective life of the hydrogenation catalyst by nineteen times. From these results it was calculated that the hydrogenation catalyst in a plant of commercial size would have an effective life of only 13.2 days while hydrogenating acid washed product but would have an effective life of 254 days when the formylation material had been steam distilled.

To recapitulate, the improvements of the described process of invention effect recovery of cobalt catalyst by a phase migration to an easily recyclable aqueous solution, increase hydrogenation catalyst life by as much as nineteen times, reduce the aldehyde content of the alcohol product, and avoid excessive decomposition of oxygenated compounds during the hydrogenation step.

Having described my invention, I claim:

1. A process of preparing alcohols from carbon monoxide, hydrogen and at least one olefinic hydrocarbon having from about 3 to 12 carbon atoms per molecule, the said process comprising: flowing the said carbon monoxide, hydrogen and olefin into mutual contact at a temperature between about 100° C. and 250° C. and a pressure between about 50 and 250 atmospheres in the presence of an aqueous solution of a potential cobalt catalyst compound that forms under reaction conditions an oil-soluble cobalt carbonyl compound and effects a formylation of the said olefin, producing thereby a mixture comprising an aldehyde, having one more carbon atom per molecule than an employed corresponding olefin, and dissolved cobalt carbonyl compound; removing the said mixture from the said reaction zone and directly and in the absence of the intervention of any treatment of the mixture steam distilling the said mixture with saturated steam in the presence of water containing an acidic component at a rate sufficient to prevent substantial accumulation in the distillation zone of steam-distillable components of the said mixture, simultaneously decomposing the said dissolved cobalt carbonyl compound in the presence of the acidic water thereby forming a reaction product of cobalt and the said acidic component and thereby effecting transfer of cobalt to a water-soluble cobalt compound in solution in the said water; separating the water from residue of the said steam distillation and recycling the aqueous cobalt catalyst solution to the formylation step; condensing aldehydic distillate from said steam distillation and hydrogenating at least a fraction of so-condensed distillate in the presence of a hydrogenation catalyst at a pressure between about 10 and 100 atmospheres and a temperature between about 100° and 250° C., thereby producing an alcohol having one more carbon atom per molecule than the corresponding employed olefin.

2. In an Oxo process in which olefinic hydrocarbons having from 3 to 12 carbon atoms per molecule are formylated with hydrogen and carbon monoxide in the presence of a volatile cobalt carbonyl catalyst compound that is derived from a non-volatile potential cobalt catalyst compound under reaction conditions, and hydrogenting the formylation product to produce a monohydric alcohol having one more carbon atom per molecule than the reactant olefin, the combination of steps consisting of: removing vaporous product from the formylation zone, condensing liquids containing aldehydes and dissolved cobalt carbonyl compound therefrom and recycling uncondensed gases to the formylation step; steam distilling with saturated steam the condensed liquids in the presence of water containing an acidic component at a rate preventing substantial accumulation in the distillation zone of steam-distillable components thereof, simultaneously decomposing the said dissolved cobalt carbonyl compound in the presence of the acidic water, effecting reaction between cobalt and the said acidic component, and thereby effecting transfer of cobalt to a non-volatile cobalt compound in solution in the said water; introducing into the formylation zone potential cobalt catalyst compound of which at least the cobalt is that recovered by the said transfer; and hydrogenating at least a fraction of the steam distillate in the presence of a cobalt hydrogenation catalyst.

3. In a process of producing aldehydes by the reaction of a hydrocarbon having between three and twelve carbon atoms and at least one double bond per molecule with carbon monoxide and hydrogen at elevated temperature in the presence of an oil-soluble cobalt catalyst compound, the steps of withdrawing aldehyde product containing oil-soluble catalyst dispersed therein, steam-distilling the product, in the presence of a sufficient quantity of acidic water to provide an acidic aqueous liquid phase, and thereby decomposing the oil-soluble cobalt catalyst compound to form a water-soluble cobalt compound and effecting transfer of catalyst compound from the aldehyde oil-product phase to the said acidic liquid phase, and withdrawing aldehyde product as a distillate, substantially free of catalyst and without substantial loss to decomposition products.

4. A process of preparing aldehydes from carbon monoxide, hydrogen and an olefinic hydrocarbon having from three to twelve carbon atoms per molecule, the said process comprising: effecting reaction between the carbon monoxide, hydrogen and olefin in a reaction zone at a temperature between about 100° C. and 250° C. and a pressure between about 50 and 250 atmospheres in the catalytic presence of an oil-soluble cobalt carbonyl compound that is derived under the said reaction conditions from a potential cobalt catalyst compound, thereby producing a mixture comprising an aldehyde (having one more carbon atom per molecule than the said olefin), unreacted olefin, bottoms and carbonyl compound; removing said mixture from the reaction zone and directly steam distilling the mixture while maintaining it in the presence of sufficient acidic water to insure the continued coexistence of a liquid acidic aqueous phase, and by said steam distilling and maintenance of an aqueous phase effecting separation of the said aldehydes and simultaneous decomposition of the oil-soluble cobalt carbonyl compound carried over with said product from the reaction zone and transfer of cobalt from the product phase to a water-soluble cobalt compound in solution in the said acidic aqueous phase; separating so-formed aqueous cobalt solution from the residue of the steam distillation; and introducing into the reaction zone potential cobalt catalyst compound of which at least the cobalt is that recovered by the said transfer.

5. A process of preparing alcohols from carbon monoxide, hydrogen and olefinic hydrocarbon having from about three to twelve carbon atoms per molecule, the said process comprising: effecting reaction between the said carbon monoxide, hydrogen and olefin in a reaction zone at a temperature between about 100° C. and 250° C. and at a pressure between about 50 and 250 atmospheres in the presence of an oil-soluble cobalt carbonyl catalyst that is derived under the said reaction conditions from the potential cobalt catalyst, thereby producing a mixture comprising an aldehyde (having one more carbon atom per molecule than the said olefin), unreacted olefin and dissolved cobalt carbonyl compound; removing the said mixture from the reaction zone; directly thereafter flash steam distilling the said removed mixture in the presence of sufficient water to insure the constant presence of a liquid aqueous phase and at a rate sufficient to prevent substantial accumulation in the distillation zone of steam-distillable components of the said mixture; thereby decomposing said dissolved cobalt carbonyl, and forming an oil-insoluble and water-soluble cobalt salt and thus effecting transfer of oil-soluble cobalt carbonyl in solution in product oil to a water-soluble cobalt salt in solution in said water; separating so-formed aqueous cobalt solution from the residue of the flash steam distillation; introducing into the said reaction zone potential cobalt catalyst including at least a part of the cobalt that is recovered by the said transfer; and hydrogenating at least a fraction of the condensed distillate from the said steam distillation in the presence of a hydrogenation catalyst to produce alcohols therefrom.

References Cited in the file of this patent

UNITED STATES PATENTS

| Number | Name | Date |
|---|---|---|
| 2,486,693 | Van't Spijker et al. | Nov. 1, 1949 |
| 2,514,961 | Max | July 11, 1950 |